(12) United States Patent
Huang et al.

(10) Patent No.: US 10,844,795 B2
(45) Date of Patent: Nov. 24, 2020

(54) FEEDFORWARD AND FEEDBACK ARCHITECTURE FOR AIR PATH MODEL PREDICTIVE CONTROL OF AN INTERNAL COMBUSTION ENGINE

(71) Applicant: TOYOTA MOTOR ENGINEERING & MANUFACTURING NORTH AMERICA, INC., Erlanger, KY (US)

(72) Inventors: Mike X. Huang, Ann Arbor, MI (US); Shinhoon Kim, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 178 days.

(21) Appl. No.: 15/866,767

(22) Filed: Jan. 10, 2018

(65) Prior Publication Data

US 2019/0211753 A1 Jul. 11, 2019

(51) Int. Cl.
*G02B 11/32* (2006.01)
*G05B 13/04* (2006.01)
(Continued)

(52) U.S. Cl.
CPC ....... *F02D 13/0207* (2013.01); *F02D 41/005* (2013.01); *F02D 41/0007* (2013.01);
(Continued)

(58) Field of Classification Search
CPC ............ F02D 13/0207; F02D 41/0087; F02D 41/406; F02D 41/1406; F02D 41/0052;
(Continued)

(56) References Cited

U.S. PATENT DOCUMENTS

| 4,663,703 A * | 5/1987 | Axelby ................ G05B 13/048 700/29 |
| 7,930,045 B2 | 4/2011 | Cheng |
| 8,145,329 B2 * | 3/2012 | Pekar .................. G05B 13/048 700/44 |
| 8,265,854 B2 * | 9/2012 | Stewart ................ G05B 13/048 701/102 |

(Continued)

OTHER PUBLICATIONS

Huang (Low Complexity Model Predictive Control of a Diesel Engine Airpath, 2016 (Year: 2016).*

*Primary Examiner* — Darrin D Dunn
(74) *Attorney, Agent, or Firm* — Oblon, McClelland, Maier & Neustadt, L.L.P.

(57) ABSTRACT

A system for control of the air path of an internal combustion engine including a feed-forward controller and a feed-back controller. The feed-forward controller configured to in a sampling period, obtain model parameter values, incorporate the modeled parameter values and reference values into an optimization for a nonlinear model predictive control, perform a Newton method iteration of the optimization in order to determine a solution, and issue commands that control inputs for engine operation based on the solution. The feed-back controller configured to obtain modeled parameter values, obtain measured parameter values based on the operating condition of the engine, incorporate the modeled parameter values, measured parameter values, and reference values into an optimization for a nonlinear model predictive control, perform a Newton method iteration of the optimization in order to determine a solution, and issue commands that control inputs for engine operation based on the solution.

13 Claims, 8 Drawing Sheets

(51) Int. Cl.
*G05B 13/02* (2006.01)
*F02D 41/14* (2006.01)
*F02M 26/47* (2016.01)
*F02D 13/02* (2006.01)
*G05B 19/042* (2006.01)
*F02D 41/00* (2006.01)
*F02D 41/40* (2006.01)
*G05B 19/418* (2006.01)
*G05B 11/32* (2006.01)
*F02D 23/02* (2006.01)
*F02D 35/02* (2006.01)
*F02M 26/48* (2016.01)

(52) U.S. Cl.
CPC ..... *F02D 41/0052* (2013.01); *F02D 41/0087* (2013.01); *F02D 41/1406* (2013.01); *F02D 41/406* (2013.01); *F02M 26/47* (2016.02); *G05B 11/32* (2013.01); *G05B 13/024* (2013.01); *G05B 13/048* (2013.01); *G05B 19/0423* (2013.01); *G05B 19/41885* (2013.01); *F02D 23/02* (2013.01); *F02D 35/02* (2013.01); *F02D 41/0072* (2013.01); *F02D 2041/001* (2013.01); *F02D 2041/1412* (2013.01); *F02D 2041/1433* (2013.01); *F02D 2200/0406* (2013.01); *F02M 26/48* (2016.02)

(58) Field of Classification Search
CPC .. F02D 2041/1433; F02D 35/02; F02D 23/02; F02D 2041/001; F02D 2041/1412; G05B 19/41885; G05B 13/024; G05B 13/048; G05B 11/32; G05B 19/0423; F02M 26/47; F02M 26/48
See application file for complete search history.

(56) References Cited

U.S. PATENT DOCUMENTS

| | | | |
|---|---|---|---|
| 8,825,185 B2* | 9/2014 | Salsbury | G05B 13/048 700/31 |
| 9,235,657 B1 | 1/2016 | Wenzel et al. | |
| 2003/0014973 A1* | 1/2003 | Mazaud | F01L 1/34 60/602 |
| 2003/0145836 A1* | 8/2003 | Linna | F02B 1/12 123/501 |
| 2006/0207253 A1* | 9/2006 | Sumser | F02B 37/12 60/602 |
| 2008/0189027 A1* | 8/2008 | Chen | F02D 41/0002 701/108 |
| 2009/0143872 A1* | 6/2009 | Thiele | G05B 13/048 700/30 |
| 2010/0050607 A1* | 3/2010 | He | F01N 3/0253 60/286 |
| 2010/0087933 A1* | 4/2010 | Cheng | G05B 19/0423 700/30 |
| 2010/0305719 A1* | 12/2010 | Pekar | G05B 13/024 700/29 |
| 2011/0125293 A1* | 5/2011 | Havlena | G05B 13/048 700/30 |
| 2014/0174413 A1* | 6/2014 | Huang | F02B 47/08 123/568.18 |
| 2016/0146134 A1 | 5/2016 | Wang et al. | |
| 2016/0160787 A1* | 6/2016 | Allain | F02D 41/1401 701/103 |
| 2016/0363063 A1 | 12/2016 | Pochner et al. | |
| 2017/0122228 A1* | 5/2017 | Hellstrom | F02D 9/02 |
| 2017/0130834 A1 | 5/2017 | Zhang et al. | |
| 2017/0218860 A1* | 8/2017 | Pachner | F02D 41/1401 |
| 2018/0179969 A1* | 6/2018 | Lahti | F02D 41/0077 |
| 2018/0179975 A1* | 6/2018 | Merlino | F02D 41/1405 |
| 2020/0016337 A1* | 1/2020 | Rollins | A61M 5/1723 |

* cited by examiner

FEEDFORWARD AND FEEDBACK ARCHITECTURE FOR AIR PATH MODEL PREDICTIVE CONTROL OF AN INTERNAL COMBUSTION ENGINE

FIELD OF DISCLOSURE

The present disclosure relates generally to methods and controls for internal combustion engines and, more particularly, to methods for controlling diesel engines. The methods and controls reduce the feed-forward and feed-back controller development time and calibration by using Model Predictive Control for both feed-forward and feed-back.

BACKGROUND

Modern diesel engines use variable geometry turbines (VGT) to increase the amount of air supplied to the engine cylinders. The VGT varies the angle of the turbine stator inlet vanes to change the amount of air supplied to the engine cylinders. In addition to providing optimum performance and fuel economy, modern diesel engines must also meet stringent federal regulations on emissions, particularly, particulate matter and nitrogen oxides. In order to meet all of these requirements, diesel engines with a VGT also use an exhaust gas recirculation (EGR) valve that has a variable controlled position to recirculate varying amounts of engine exhaust gases back into the engine cylinders for more complete combustion and reduced engine emissions. As the engine operates over a large range of operating conditions, including engine speed, fuel usage, engine load, etc., one and typically multiple controllers are embedded in the engine control unit (ECU) to control various engine actuators in response to sensors detecting engine performance in order to optimize engine performance, and emissions.

An important example of a real-time, embedded optimization problem is model predictive control (MPC), where an optimal control problem over a receding horizon is solved during each sampling period. See L. Griine and J. Pannek, "Nonlinear model predictive control," in *Nonlinear Model Predictive Control*, pp. 43-66, Springer, 2011; J. B. Rawlings and D. Q. Mayne, *Model predictive control: Theory and design*. Nob Hill Pub., 2009; and G. C. Goodwin, M. M. Seron, and J. A. De Doná, *Constrained control and estimation: an optimisation approach*. Springer Science & Business Media, 2006, each incorporated herein by reference in their entirety. The optimal control problem for a discrete time linear-quadratic MPC formulation can be expressed as a convex quadratic program (QP). Furthermore, convex QPs form the basis for many algorithms used in nonlinear model predictive control (NMPC) such as sequential quadratic programming (SQP), one of the most successful methods in nonlinear programming, or the real-time iteration scheme which solves just one QP per timestep. See P. T. Boggs and J. W. Tolle, "Sequential quadratic programming," *Acta numerica*, vol. 4, pp. 1-51, 1995; S. Gros, M. Zanon, R. Quirynen, A. Bemporad, and M. Diehl, "From linear to nonlinear mpc: bridging the gap via the real-time iteration," *International Journal of Control*, pp. 1-19, 2016; and M. Diehl, H. G. Bock, J. P. Schlöder, R. Findeisen, Z. Nagy, and F. Allgöwer, "Real-time optimization and nonlinear model predictive control of processes governed by differential-algebraic equations," *Journal of Process Control*, vol. 12, no. 4, pp. 577-585, 2002, each incorporated herein by reference in their entirety.

The use of Model Predictive Control (MPC) is growing for engine control. For example, a standard MPC approach incorporates integral type action to guarantee zero state-to-state error that adds additional integral states to the predictive control model. The MPC model uses a number of different engine operating ranges (fuel rate and engine speed), and develops a controller for each range to control the engine actuators.

In the case of a diesel engine, model predictive control may be applied to diesel engine airflow, in which the air flow in the engine is controlled using the variable geometry turbine (VGT), EGR throttle, and an EGR valve actuator. These control elements are strongly coupled and are highly non-linear.

Typically, a control architecture for ICE air path control consists of a feed-forward controller that is based on nominal maps and rule based logic, and a feed-back controller which takes measurements of the system and adjusts the controlled inputs to more exactly reach the desired outputs in the event that there is inaccuracy in the nominal maps. The feed-back controller requires significant calibration and rule based logic design.

It would be desirable to provide model predictive control in both the feed-forward controller and the feed-back controller. Using model predictive control in the feed-forward controller can reduce the feed-forward controller development time and calibration. Also, using model predictive control in both the feed-forward controller and the feed-back controller enables the controllers to perform its required operations within a fixed percentage of a sampling period. Use of Model Predictive Control in these controllers involves obtaining a model of the engine and using a computer to optimize the inputs, throttle, valve, and VGT, to minimize EGR rate and MAP tracking error and obtain high performance.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to techniques for constrained optimization applied to embedded model predictive control in a diesel engine.

Figure 1:
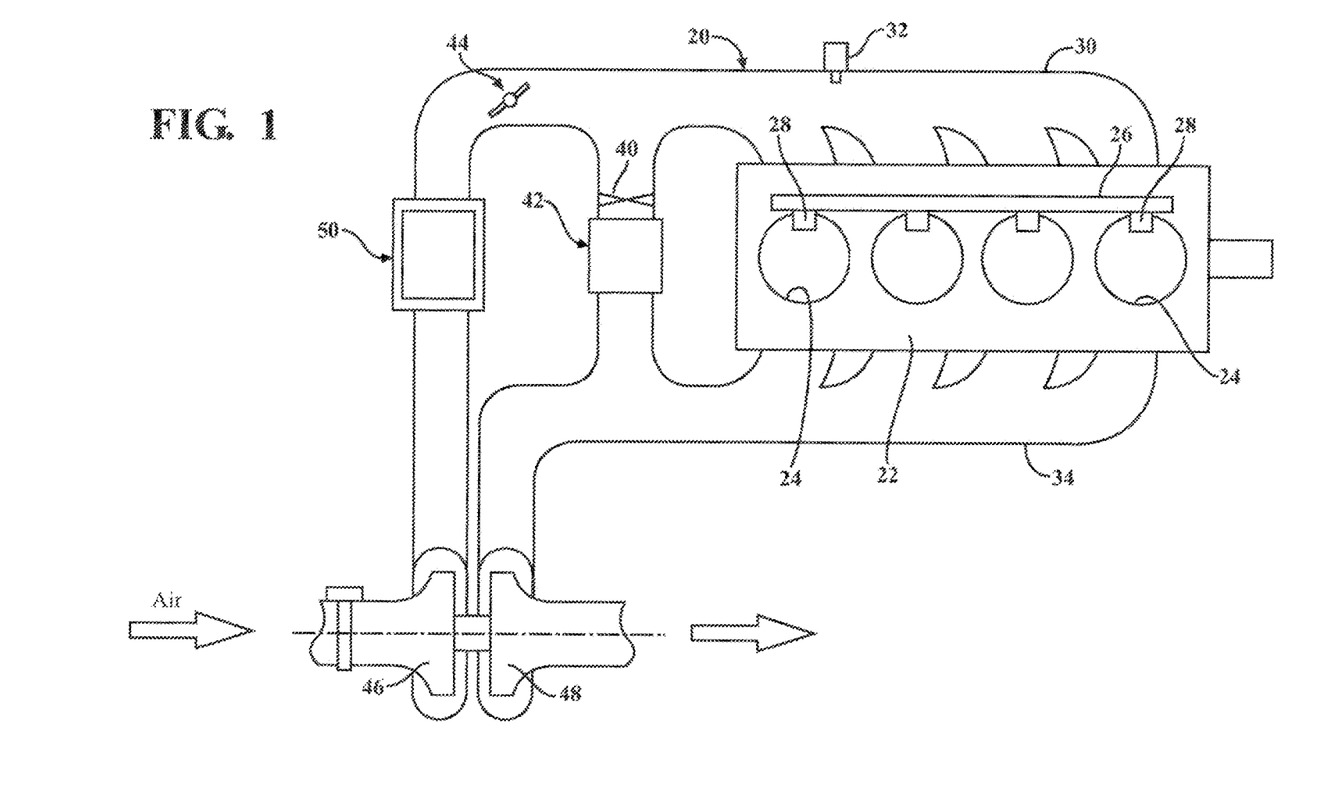
FIG. 1 shows a schematic representation of a diesel engine according to an exemplary aspect of the disclosure.

FIG. 1 shows a schematic representation of a diesel engine according to an exemplary aspect of the disclosure. Although a diesel engine is disclosed as an example of an internal combustion engine, there are other types of internal combustion engines. An internal combustion engine can include any engine that uses the transformation of chemical energy into mechanical energy. In this disclosure, the internal combustion engine is one that is used in a vehicle and is controlled by a computer system.

Referring to FIG. 1, an internal combustion engine 20, described hereafter by example as a diesel engine, includes an engine block 22 housing a plurality of cylinders 24. A fuel rail 26 connected to a fuel supply supplies diesel fuel to a plurality of fuel injectors 28 with one fuel injector provided for each cylinder 24. Although the drawing shows four cylinders 24, the number of cylinders 24 may be varied. An intake manifold 30 is coupled to the cylinders 24 for supplying intake air to each cylinder. An intake manifold pressure sensor 32 is coupled to the intake manifold 30 for measuring intake manifold air pressure. An exhaust manifold 34 carries combustion gases from the cylinders 24 away from the engine block 22. An Exhaust Gas Recirculation (EGR) valve 40 is coupled in a bypass path between the intake manifold 30 and the exhaust manifold 34 to recirculate a portion of the exhaust gases from the exhaust manifold 34 back into the intake manifold 32 for supply to the cylinders 24. An EGR cooler 42 may be coupled in the bypass path along with the EGR valve 40. An EGR throttle 44 is mounted in the airflow path from the compressor 46 of the variable geometry-turbine (VGT) 48 to control gas circulation. An intercooler 50 may be mounted in the intake air path ahead of the EGR throttle 44. The variable geometry turbine 48, by controlling the angle of the turbine input vanes, controls the intake manifold pressure via the compressor 46.

In order to control an internal combustion engine by a computer system, the computer obtains data from the engine in the form of sensor readings. The internal combustion engine 20 may be provided with various sensors for pressure, temperature, air flow and engine speed. By way of example, the sensors may include an intake manifold pressure (MAP) sensor, boost pressure sensor, a measured air flow (MAF) sensor, EGR rate, compressor flow sensor, and an engine speed reader. In one embodiment, an Engine Control Unit may derive other parameters using the sensor readings. Examples of other parameters include EGR rate reference, MAP reference, and fuel rate.

The example internal combustion engine shown in the figure has a diesel air path that includes actuators: an EGR valve, EGR throttle, and VGT. An aspect is a EGR valve that has a minimum and a maximum position. An aspect is an EGR throttle that has a minimum and a maximum throttle. An aspect is a VGT that has a minimum and a maximum throttle position. The example diesel air path includes the following parameters as outputs: exhaust temperature and pressure, boost pressure, turbine speed, and EGR rate.

Figure 2:
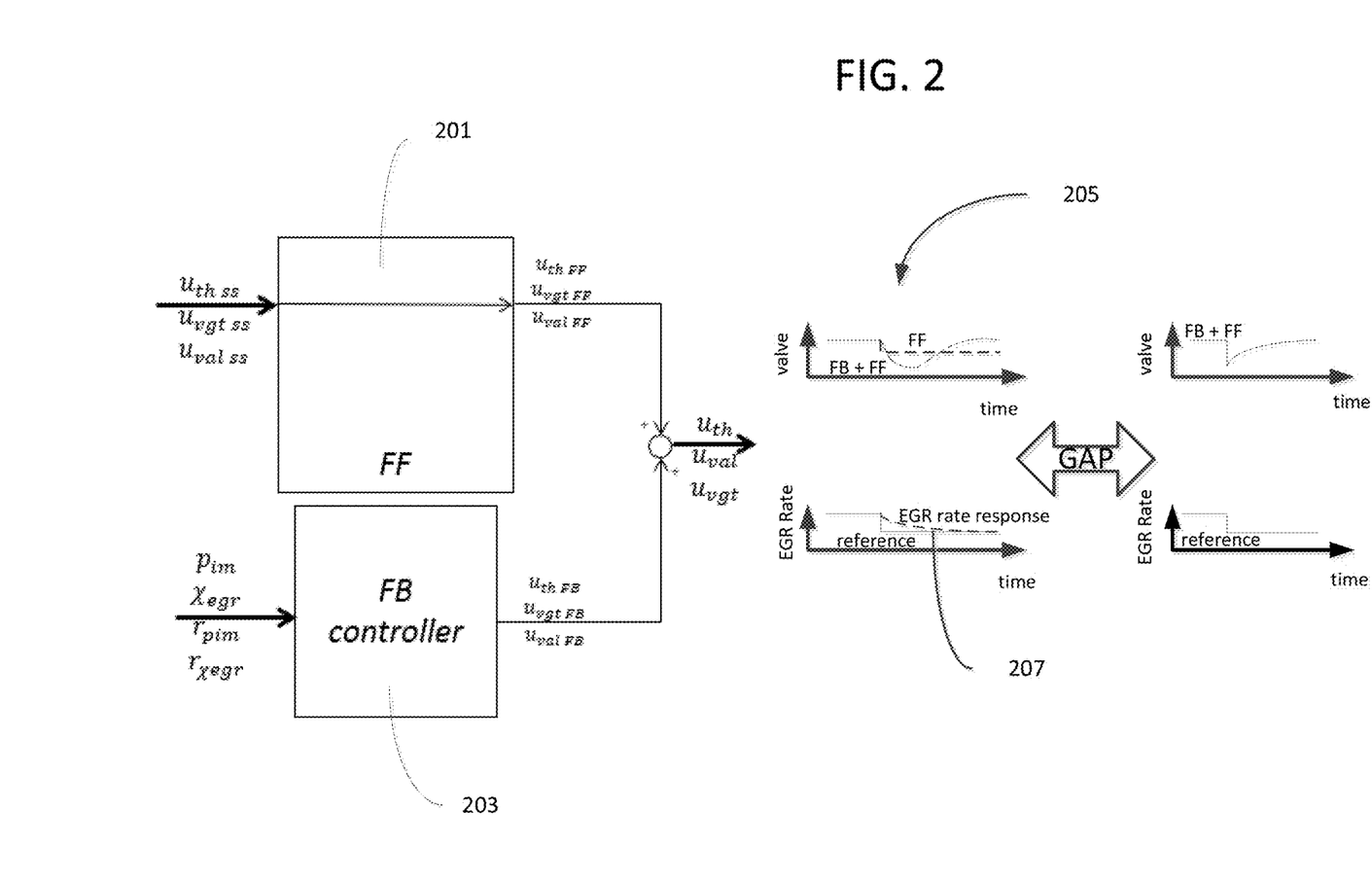
FIG. 2 shows a control structure for feed-forward calibration.

Referring to FIG. 2, an example aspect is a control structure for the internal combustion engine 20 that may have two parts. A feed-forward part 201 is used to obtain fast action under assumed nominal conditions. A feed-back part 203 is used to correct the action and reach the target even under uncertainty. The feed-back controller takes measurements of the system and adjusts the controlled inputs to more exactly reach the desired outputs.

In order for the control structure to control an internal combustion engine, it must be calibrated. One approach to calibrating is to calibrate the controller through a trial and error process. In an example embodiment, the feed-forward part may be calibrated through trial-and-error, which involves performing several trials. In an example first trial, the EGR valve may show only a small contribution in the feed-forward part. The resulting EGR rate response may be slow. However, it is desired that an engine have a very large initial EGR valve action and have a faster EGR rate response. Subsequently, the control structure initially results in a large gap between the initial trial and the ideal response.

Figure 3:
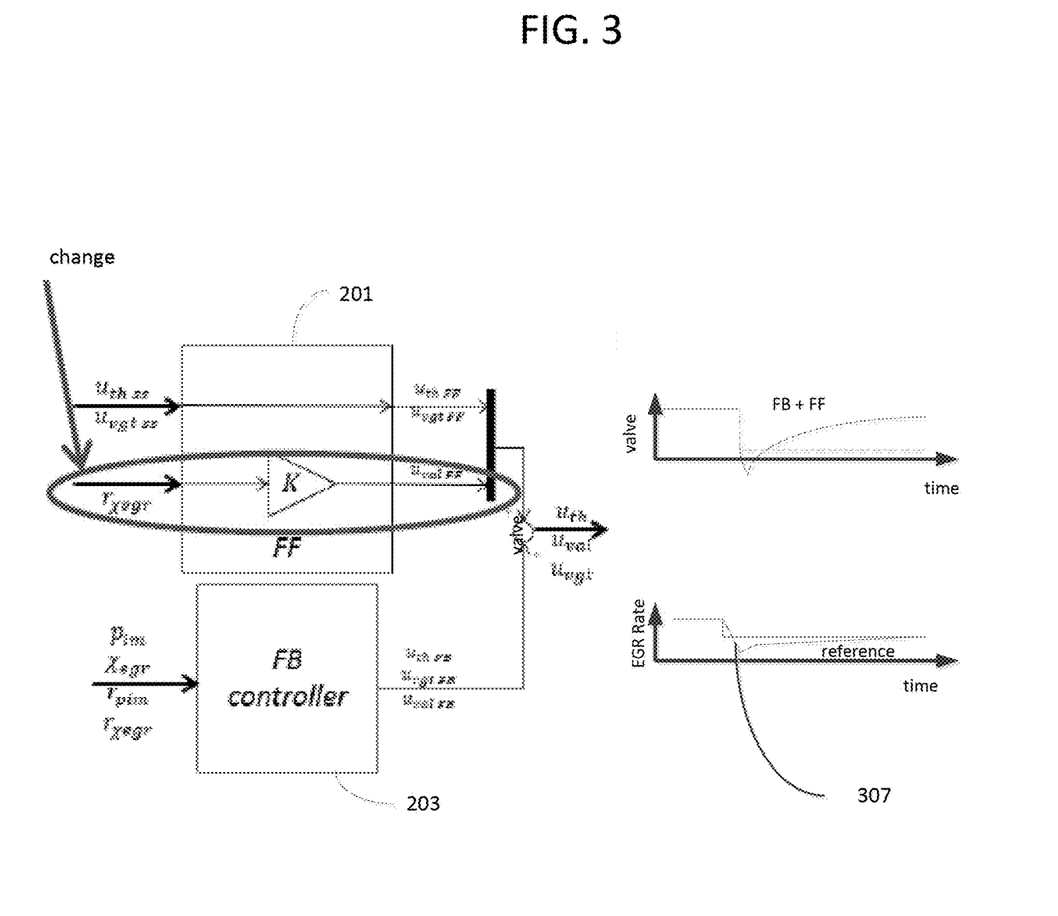
FIG. 3 shows an example of a trial for feed-forward calibration.
Figure 4:
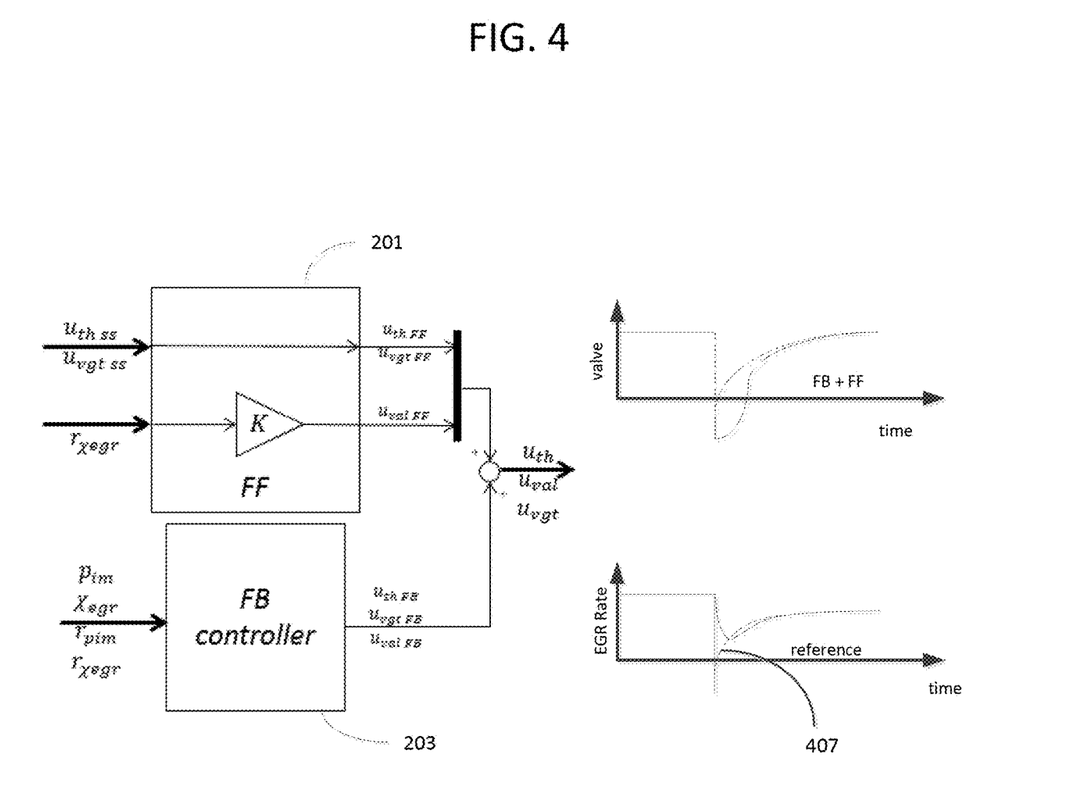
FIG. 4 shows an example of later trials for feed-forward calibration.

FIGS. 2-4 show example results from trials during calibration of the feed-forward part. Referring to FIG. 2, the example first trial 205 (Trial 1) for calibrating the feed-forward part is based on steady-state maps only. An assessment may next be performed to analyze the results of the first trial to determine why the feed-forward contribution is so small for the EGR valve. As can be seen in 207 of the figure, the steady state EGR rate target has a consistent downward trend. However, the actual steady state EGR valve position does not change much in most of its range. Thus, the map may not accurately reflect control to be performed by the feed-forward part. The assessment may reveal a possible solution that the valve feed-forward part should be based on the steady state EGR rate target instead of steady state valve position.

Subsequently, referring to FIG. 3, a second trial (Trial 2) may be performed in which the valve feed-forward contribution is based on the steady state EGR rate target. The second trial may result in a new valve position and EGR rate response that achieves a much larger feed-forward contribution. As can be seen in 307 of the figure, the resulting EGR rate response is faster but still takes too much time to reach the reference value.

Referring to FIG. 4, a third trial (Trial 3) may be performed that modifies the reference so that the feed-forward part has a more aggressive shape and thus the EGR rate response 407 improves. Subsequent trials may involve further modifications to signals, calibration of the feed-forward part for other actuators and for other outputs. Thus, this process of performing trials takes substantial time and expense and may not be effective. An alternative approach to calibration is to calculate the control action by an optimization controller.

In one embodiment of the present disclosure, a feed-forward part may be implemented with a non-linear model predictive control. The Model Predictive Control may use a plant model and constrained optimization to find the optimal control inputs that minimize EGR rate and Map tracking error. An aspect is a cost function that is formed from the plant model. An aspect may be to include one or more penalties in the cost function, for example an output error penalty and a control effort penalty. An aspect may be to include one or more constraints in the cost function, for example input constraints and output constraints. An example input constraint may include constraining the VGT throttle to be between a minimum and a maximum position. An example output constraint may include constraining an intake manifold pressure to be less than a maximum pressure. The optimization is then solved by minimizing the cost function subject to the penalties and/or constraints.

An aspect is a plant model that may be developed based on a variety of operating conditions. In order to develop the model, a random input perturbation sequence may be generated at each of the various operating conditions. For example, during normal operation, ideally the operating condition of the engine is determined at each sample. An aspect is operating conditions including, for example, engine speed and fuel mass flow rate. Next, interpolation is performed between the various operating conditions to obtain a Linear Parameter Varying (LPV) model. Higher order terms (H.O.T.), such as a Taylor Series Expansion may be added to the linear model. Next, the model may be fitted and interpolated between the operating conditions.

Figure 5:
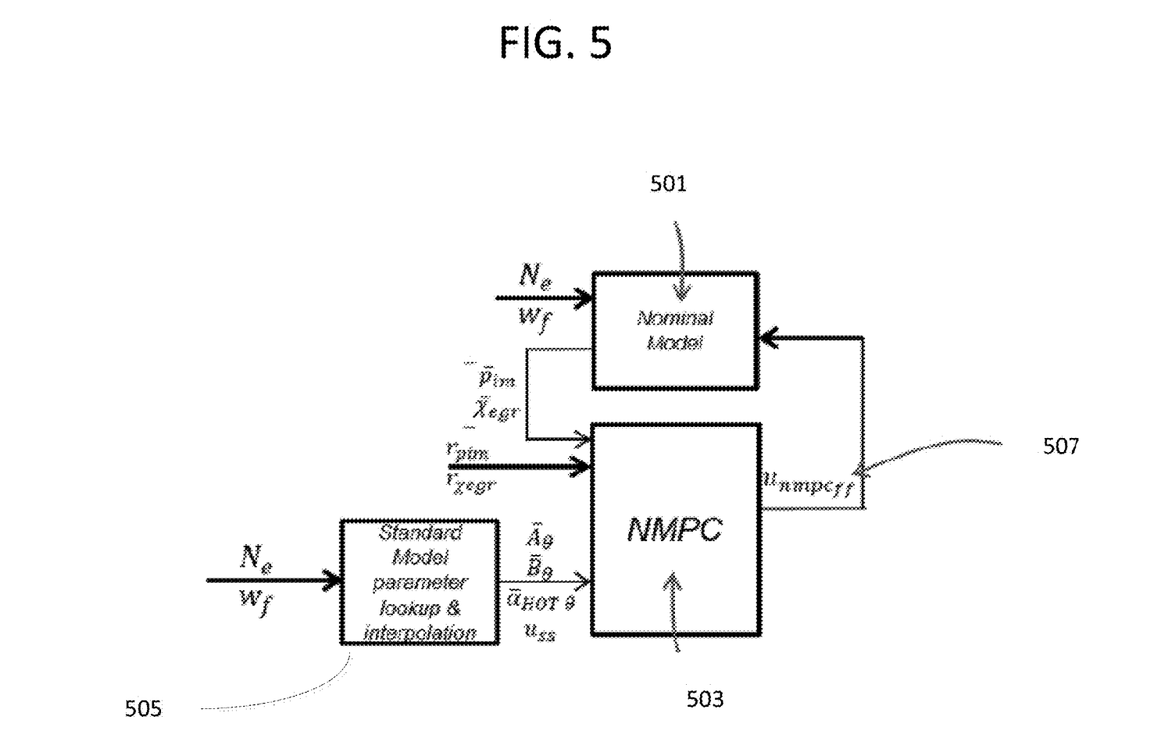
FIG. 5 shows a feed-forward controller according to an exemplary aspect of the disclosure.

FIG. 5 shows a feed-forward controller according to an exemplary aspect of the disclosure. The feed-forward controller preferably uses Model Predictive Control. Parameters for Model Predictive Control are preferably determined off-line in ideal operating conditions. The feed-forward controller may then be used in controlling an engine based on modeled parameter values. The feed-forward controller may include control circuitry such as a standard nominal model 501, a Nonlinear Model Predictive Control 503, and a standard model parameter lookup and interpolator 505. In particular, referring to FIG. 5, an LPV model with second order terms may serve as a standard nominal model 501. The standard nominal model 501 provides a modeled intake manifold pressure $pi_m$ and a modeled EGR rate $x_{egr}$ for input to the Nonlinear Model Predictive Control (NMPC) 503. The Nonlinear Model Predictive Control 503 takes as input standard model parameters $A_\theta$, $B_\theta$, $\alpha_{dstep}$, $\mu_{ss}$ from the lookup 505, references for intake manifold pressure $r_{pim}$ and EGR rate $r_{xegr}$, and generates actuator values for feed-forward control. The output of NMPC 503 represents an optimal control action under perfect conditions according to the optimization. The optimization performed by the NMPC 503 may be mathematically expressed as, $$\min_{u_i, i \in \{0, \ldots, N\}} \sum_{i=0}^{N-1} (x_i - r_k)^T Q(x_i - r_k) + (u_i - u_{ss\,\theta})^T R(u_i - u_{ss\,\theta})$$

where $$x_{i+1} = x_{ss\,\theta} + A_\theta(x_i - x_{ss\,\theta}) + B_\theta(u_i - u_{ss\,\theta}) + \begin{bmatrix} x_i - x_{ss\,\theta} \\ u_i - u_{ss\,\theta} \end{bmatrix}^T \alpha_{8ms\,HOT\,\theta} \begin{bmatrix} x_i - x_{ss\,\theta} \\ u_i - u_{ss\,\theta} \end{bmatrix} x_0 = x_k$$

and x represents measurements including intake manifold pressure (kPa) $p_{im}$, EGR rate (%) $x_{egr}$. u represents actuators including throttle position (% closed) $u_{th}$, valve position (% open) $u_{val}$, VGT position (% closed) $u_{vgt}$. r represents references including intake manifold pressure reference (kPa) $r_{pim}$, and EGR rate reference (%) $r_{xegr}$. θ represents an operating condition for a sample k.

In an example aspect of the present disclosure, Newton's method for solving optimization problems may be used to find a solution to the nonlinear optimization function. An aspect is to solve the optimization problem in real time by performing a Newton iteration only once per sample. The real time solution is possible because sampling is faster than engine dynamics.

Figure 6:
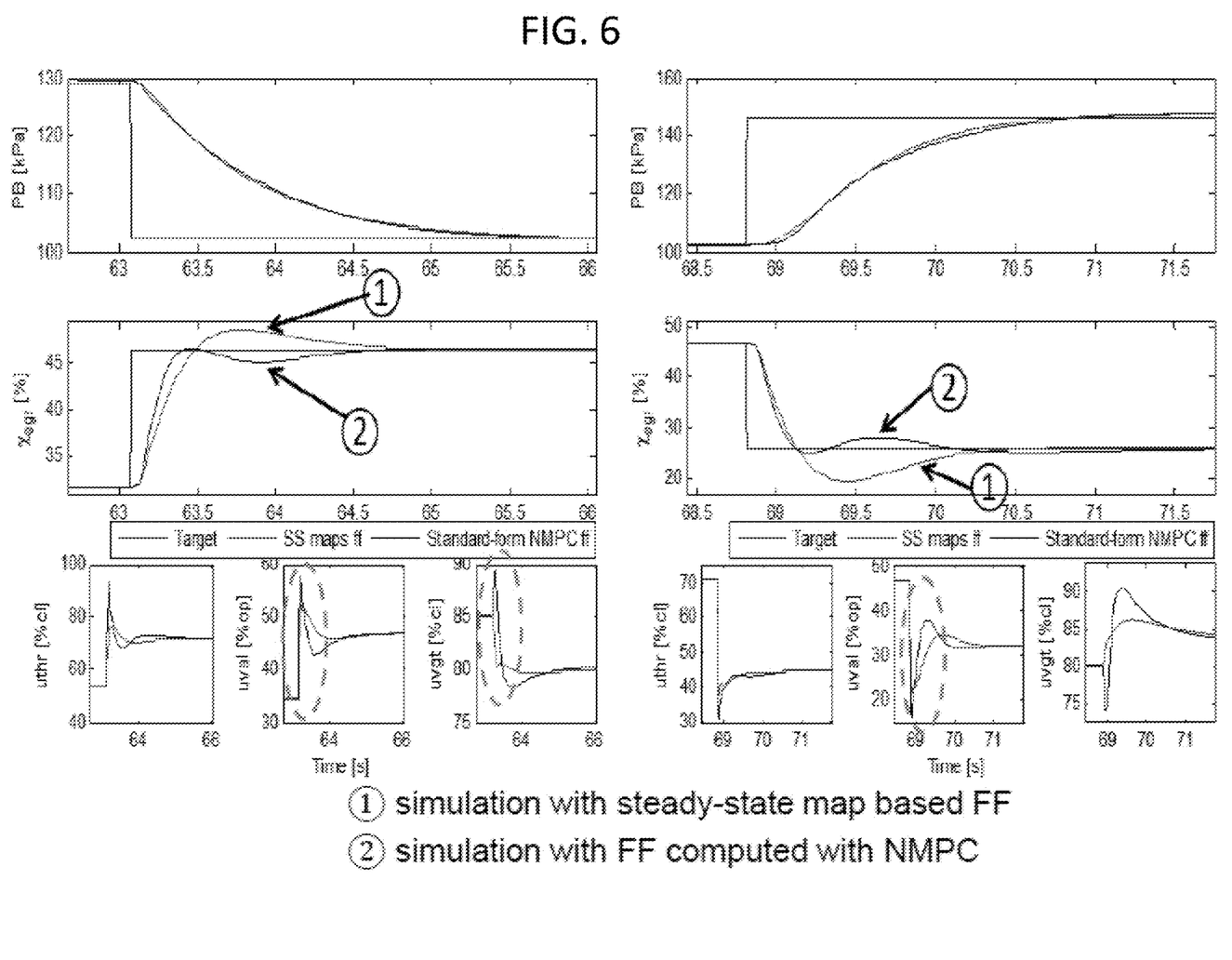
FIG. 6 shows a comparison of results for a feed-forward controller with and without non-linear model predictive control.

FIG. 6 shows a comparison of results for a feed-forward controller with and without non-linear model predictive control. Referring to FIG. 6, it can be seen that performing a control operation using a steady-state map and performing the same control operation with a feed-forward control performed using the NMPC, convergence is achieved faster using the NMPC.

In one embodiment, the optimization problem may be extended to include constraints. Adding constraints to the optimization problem may be carried out by adding one or more cost elements to the optimization function. Cost elements may be added for any of the modeled parameters, such as intake manifold pressure, EGR rate, and any of the modeled actuator positions, such as throttle position, valve position and VGT position. The added cost element may be of the form $v(x_i, u_i)$. Because the controller is optimization based, performance can be improved and constraints can be enforced explicitly.

Figure 7:
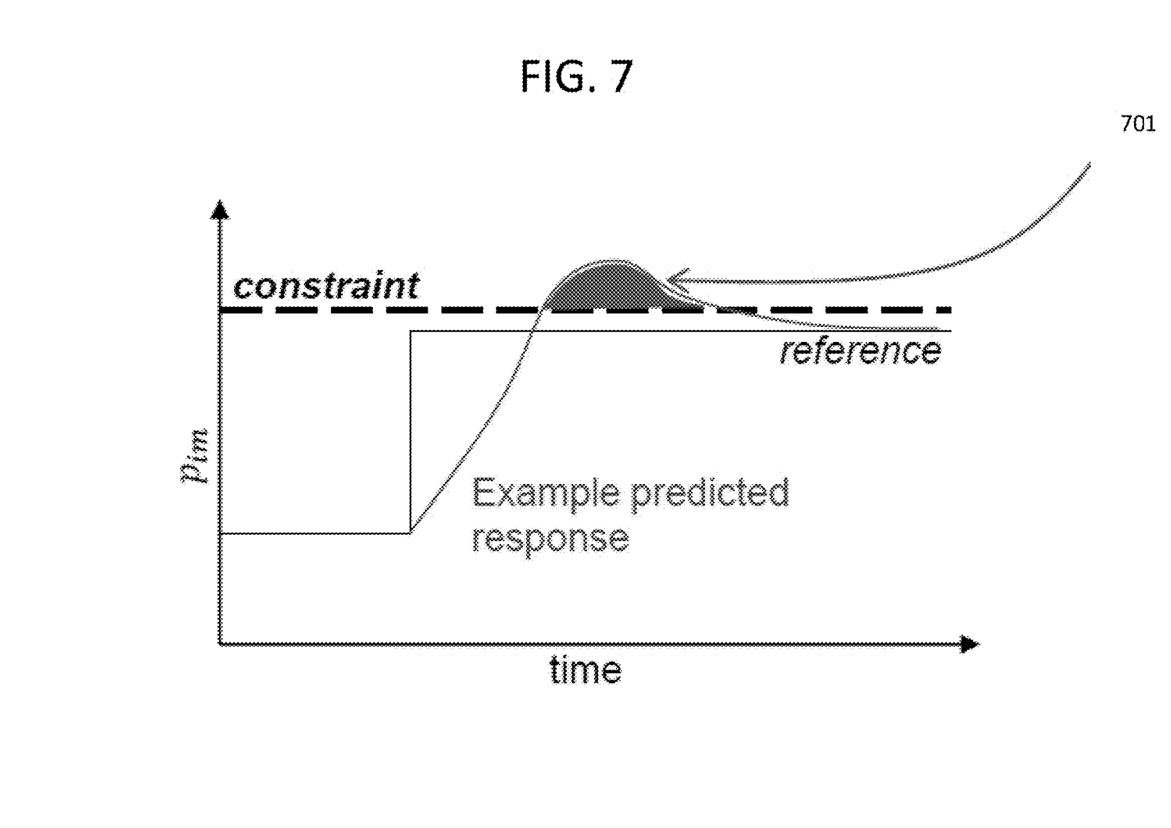
FIG. 7 shows an example response for input pressure with a constraint according to an exemplary aspect of the disclosure.

FIG. 7 shows an example response for input pressure subject to a constraint according to an exemplary aspect of the disclosure. Referring to FIG. 7, the predicted response may include a constraint for the intake pressure. An additional cost associated with the constraint on the intake pressure $P_{im}$ may push the optimization away from a constraint zone.

An example aspect of the present disclosure may be to implement solution of the optimization for the feed-forward control by execution in a computer system that includes a multicore processor. An example multicore processor may contain a quad-core processor in a computer system including SDRAM local memory and global memory, flash memory, various I/O interfaces, and a Host interface. In one embodiment, the feed-forward and feed-back controls are program code that has been embedded into a small microprocessor or microcontroller.

Figure 8:
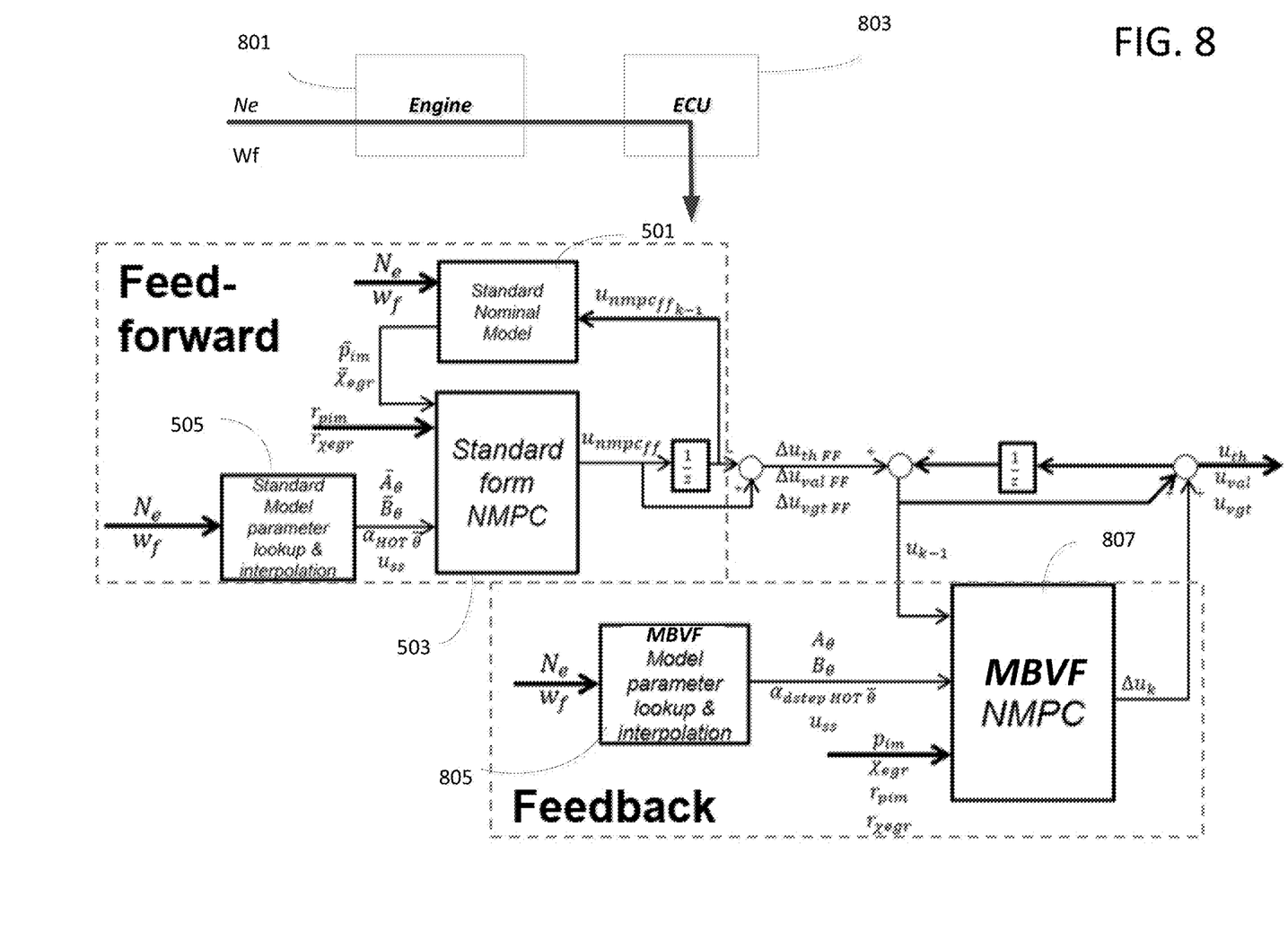
FIG. 8 shows a block diagram of feed-forward and a feed-back control of an internal combustion engine according to an exemplary aspect of the disclosure.

FIG. 8 shows a block diagram of feed-forward and a feed-back control of an internal combustion engine according to an exemplary aspect of the disclosure. In one embodiment, both the feed-forward and feed-back control use Model Predictive Control. Unlike the feed-forward controller, the feed-back controller incorporates measured parameter values based on actual sensor outputs, together with the modeled parameter values and reference values, into an optimization for a nonlinear model predictive control. Referring to FIG. 8, the feed forward control determines optimal control under nominal conditions to give very fast response to control engine 801. As in FIG. 5, the feed forward control includes standard nominal model 501, standard nonlinear MPC 503, which is provided with parameter values from standard model parameter lookup 505. A feed-back control contributes robust control adjustments to handle off nominal conditions, i.e., real situation with non-perfect model. The feed-back control may include a Move-blocked Velocity-form NMPC 807 (MBVF NMPC) to get zero steady state tracking error. The MBVF NMPC receives model parameters from a lookup 805.

In an embodiment, the ECU 803 may sample over a sampling period. During the sampling period, the ECU 803 records measurements from sensors, performs optimization calculations, and issues commands. Thus, an aspect is the ECU preferably performs its required operations within a fixed percentage of the sampling period, referred to as a computational budget.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for control of an internal combustion engine, the system comprising:
   control circuitry configured to
   provide feed-forward control in a sampling period including
      outputting from a standard nominal model at least one of a modeled intake manifold pressure and a modeled exhaust gas recirculation (EGR) rate based on engine speed and fuel rate,
      obtaining standard modeled parameter values from a memory based on the engine speed and fuel rate,
      incorporating the at least one output from the standard nominal model, the standard modeled parameter values, and reference values into a first optimization for nonlinear model predictive control, and
      performing a Newton method iteration of the first optimization in order to determine a feedforward solution:
   provide feed-back control including
      obtaining measured parameter values based on sensor outputs indicating an operating condition of the engine,
      incorporating the modeled parameter values, the measured parameter values, and reference values into a second optimization for nonlinear model predictive control, and
      performing a Newton method iteration of the second optimization in order to determine a feedback solution; and
   issue commands that control inputs for engine operation based on the feedforward and feedback solutions.

2. The system of claim 1, wherein the first optimization includes a cost function to be optimized and constraints to be enforced.

3. The system of claim 1, wherein the standard modeled parameter values are provided in a lookup table.

4. The system of claim 2, wherein the constraints include maximum exhaust pressure, boost pressure, variable geometry turbines (VGT) speed, and the EGR rate.

5. The system of claim 2, wherein the constraints include minimum and maximum exhaust gas recirculation (EGR) valve positions, minimum and maximum variable geometry turbines (VGT) positions, and minimum and maximum EGR throttle positions.

6. The system of claim 1, wherein the internal combustion engine is a diesel engine.

7. The system of claim 1, wherein the feedback control includes move blocking.

8. A method for control of an internal combustion engine, the method comprising:
   in a sampling period,
   performing feed-forward control with a feed-forward controller by
      outputting from a standard nominal model at least one of a modeled intake manifold pressure and a modeled exhaust gas recirculation (EGR) rate based on engine speed and fuel rate;
      obtaining standard modeled parameter values from a memory based on the engine speed and fuel rate;
      incorporating the at least one output from the standard nominal model, the modeled parameter values, and reference values into a first optimization for nonlinear model predictive control;
      performing a Newton method iteration of the first optimization in order to determine a feedforward solution;
   performing feed-back control with a feedback controller by
      obtaining measured parameter values based on sensor outputs indicating an operating condition of the engine,
      incorporating the modeled parameter values, the measured parameter values, and reference values into a second optimization for nonlinear model predictive control,
      performing a Newton method iteration of the second optimization in order to determine a feedback solution; and
   issuing commands that control inputs for engine operation based on the feedforward and feedback solutions.

9. The method of claim 8, wherein the first optimization includes a cost function to be optimized and constraints to be enforced.

10. The method of claim 8, wherein the standard modeled parameter values are provided in a lookup table.

11. The method of claim 9, wherein the constraints include maximum exhaust pressure, boost pressure, variable geometry turbines (VGT) speed, and the EGR rate.

12. The method of claim 9, wherein the constraints include minimum and maximum exhaust gas recirculation (EGR) valve positions, minimum and maximum variable geometry turbines (VGT) positions, and minimum and maximum EGR throttle positions.

13. The method of claim 8, wherein the performing feedback control includes move blocking.

* * * * *